United States Patent [19]

Hölzer

[11] Patent Number: 4,522,410
[45] Date of Patent: Jun. 11, 1985

[54] AXLE OR SHAFT SEAL WITH OVERLAPPING RING EXTENSION MEMBERS

[75] Inventor: Helmut Hölzer, Weinheim, Fed. Rep. of Germany

[73] Assignee: Firma Carl Freudenberg, Weinheim, Fed. Rep. of Germany

[21] Appl. No.: 654,375

[22] Filed: Sep. 25, 1984

[30] Foreign Application Priority Data

Oct. 12, 1983 [DE] Fed. Rep. of Germany ....... 3337033

[51] Int. Cl.³ .......................... F16J 15/38; F16J 15/44
[52] U.S. Cl. ...................................... 277/56; 277/92; 277/176
[58] Field of Search ...................................... 277/53–56, 277/82, 83, 85, 92, 95, 173–177

[56] References Cited

U.S. PATENT DOCUMENTS

| | | | |
|---|---|---|---|
| 1,594,838 | 8/1926 | Kegresse | 277/56 X |
| 1,895,348 | 1/1933 | Schlegel et al. | 277/56 |
| 2,151,410 | 3/1939 | Richter | 277/174 X |
| 2,747,903 | 5/1956 | Heinrich | 277/92 X |
| 3,090,629 | 5/1963 | Lee et al. | 277/95 |
| 4,094,518 | 6/1978 | Cox | 277/95 |

FOREIGN PATENT DOCUMENTS 2009339 6/1979 United Kingdom ................. 277/53

Primary Examiner—Robert S. Ward
Attorney, Agent, or Firm—Felfe & Lynch

[57] ABSTRACT

An axle or shaft seal has inner and outer sealing rings for respective fixed connection to the axle or shaft and a structure thereabout with respect to which the axle or shaft is relatively rotatable axially. Each of the inner and outer rings has a pair of members associated therewith, at least one sealingly, and extending generally toward the other ring. The members associated with one ring are relatively movable and axially between the members associated with the other ring against which they are urged sealingly by a resilient element therebetween.

20 Claims, 3 Drawing Figures

AXLE OR SHAFT SEAL WITH OVERLAPPING RING EXTENSION MEMBERS

BACKGROUND OF THE INVENTION

The invention relates to an axle or shaft seal having inner and outer, relatively-rotatable sealing rings.

A seal of this type is known from U.S. Pat. No. 4,094,518. In it, the sealing pressures exerted on the outer ring by stradling first and second flanges on the inner ring are due to the shape of the inner ring, the elastic properties of the material of which the inner ring is made, and the position of the inner ring relative to the outer ring. As a result, the cross-sectional configuration of the inner ring is rather complex, and complicated tools are therefore required to fabricate it, increasing the cost of the seal product.

Further, a compromise must be made with regard to the materials used because, on the one hand, high contact pressure is required to obtain effective sealing while, on the other hand, the frictional resistance should be as low as possible to minimize transmission losses. The compromise solutions arrived at therefore always leave much to be desired in both respects.

Still further, the precise alignment between the inner and outer rings for effecting the sealing pressure requires extensive adjustment during installation. This work necessarily comes to naught when axial displacements between the parts to be sealed occur in operation as a result of load changes during torque transmission, for example.

SUMMARY OF THE INVENTION

The invention therefore has as its object improving a seal of the type outlined in such a way that the drawbacks mentioned are eliminated. As a result it can be manufactured at low cost, and its design is such that the pressures exerted on each other by the parts which are in sliding contact with each other can be selected independently of the choice of the materials used to fabricate them, the latter reducing transmission losses while improving sealing action even when axial shaft displacements occur in operation.

In accordance with the invention, this object is achieved with an axle or shaft seal having inner and outer sealing rings for respective fixed connection to the axle or shaft and a structure thereabout with respect to which the axle or shaft is relatively rotatable axially. Each of the inner and outer rings has a pair of members associated therewith, at least one sealingly, and extending generally toward the other ring. The members associated with one ring are relatively movable and axially between the members associated with the other ring against which they are urged sealingly by a resilient element therebetween. The resilient element thus maintains uniform sealing engagement between the members of the rings irrespective of relative axial displacement between the axle or shaft and structure thereabout as may occur in operation with the relative rotation therebetween. Further, because the sealing engagement pressure between the members is maintained by the resilient element rather than the members themselves, the materials for the members and resilient element may be selected independently to optimize the properties of each.

The pressure between the members which are in sealing, wiping contact with each other is produced by the resilient element which has no part in the actual, sealing, wiping contact therebetween. Elastic bodies of any kind may therefore be used as the resilient element, provided that they can be depended upon to result in uniform contact pressure over the entire circumference of the parts which are in sealing, wiping contact with one another. Suited for this, therefore, are, for example, one or more spiral springs which are uniformly distributed around the circumference of the members to urge them into engagement in the axial direction, resilient rubber elements, garter springs, or garter-like O rings made of a rubber-elastic material. The garter or garter-like element may then be mounted in radially expanded form between members which are spaced by a distance which steadily diminishes toward the ring toward which the members extend and thus form conical surfaces. The natural tendency of the resilient element to revert to its original, smaller diameter then causes the members to be forced apart axially and hence to be pressed against the members of the other ring.

In operation, the members of the one ring are thus axially displaceable relative to the other ring. Equal contact pressure between corresponding members of the rings are then assured under all operating conditions and, particularly, in the presence of axial displacements of the sealed shaft or axle as may occur during operation. The need for adjustments during installation is also eliminated in this way.

For proper operation, the members of neither the outer nor the inner ring need to have elastic properties. The choice of materials for them can therefore be broadened to combinations of materials which merely can be depended on to result in effective sealing and low frictional resistance. Even materials which up to now have not been used in seals, for example, ceramics, sintered powdered metals, glass, cast materials and thermoplastics, may be considered. Some of these materials have particularly low coefficients of thermal expansion and are very brittle, so that improper installation or temperature changes could otherwise result in destruction, for example.

Even with the invention, materials which are particularly vulnerable in this respect may require mounting on a damping layer. Particularly well suited for this is an O-ring resilient member made of a rubber-elastic material. When retained in an appropriately-configured groove, it will provide the desired axial mobility, adequate static sealing, and sufficient immobilization in the peripheral direction for transmitting rotary motion, in addition to damping compensation for thermal dimensional differences.

Particularly good surface quality of the members is not required; the resilient element will usually allow for adequate dimensional tolerances. This characteristic is of considerable importance in actual practice.

The axle or shaft seal of the invention may also be manufactured entirely from materials which are resistant to high temperatures. The design outlined at the outset does not qualify for this, for example, for reasons of a basic nature.

The member surfaces of the outer and inner rings which are in sliding contact with each other may also make a 90-degree angle with the axis of the seal. The relative radial mobility then is particularly high. Deviations in the positive or negative directions or an internal curvature of the contact surfaces are thus permissible. This makes it possible to maintain effective sealing even in the presence of relative angular displacements between the sealed machine elements due, for example, to a bent axle or shaft.

At least one of the contacting surfaces of the members may also be provided with hydro-dynamically-acting back-feed elements for seepage and/or dust. Such back-feed elements may be formed by ribs or flutes acting as paddles which will produce a return flow of leaked medium and/or dust into the space from which it came with the relative rotary motion of the axle or shaft.

BRIEF DESCRIPTION OF THE DRAWINGS

Merely illustrative, but preferred embodiments of the invention will now be described in greater detail with reference to the accompanying drawings, wherein.

DESCRIPTION OF THE PREFERRED EMBODIMENTS

Figure 1:
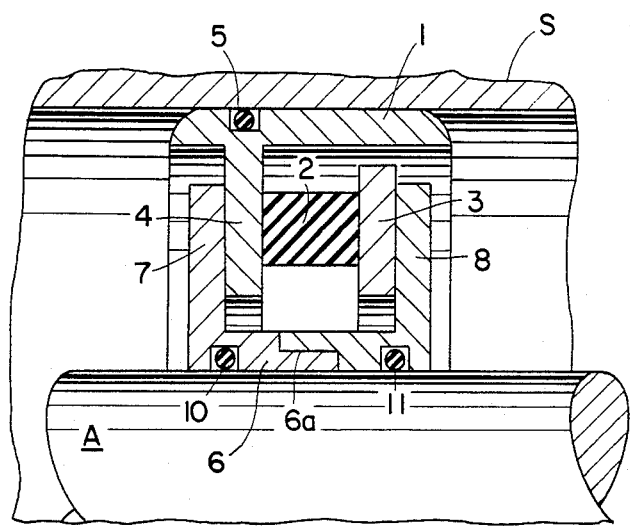
FIG. 1 shows a diametric, cross-sectional elevation of a diametric half of a first preferred embodiment in operative association with an axle or shaft and structure thereabout.

The axle or shaft seal shown in FIG. 1 consists of an outer ring 1 and an inner ring 6. The inner ring has two flange members 7 and 8 at its opposite ends which project in the radial direction for a U-shaped section. The flange members 7,8 abut with their facing surfaces on the external surfaces of two, inwardly-projecting members 3 and 4 of the outer ring 1, member 3 being a detached or "partial" ring so that the members 3 and 4 are movable independently of each other. Member 3 is supported on member 4 and both members are pressed against the flanges 7 and 8 of the inner ring 6 by a plurality of resilient elements 2 (only one shown) which are uniformly distributed around the rings.

The resilient elements 2 are made, for example of a rubber-elastic material. The outer ring is formed of polytetrafluoroethylene and the inner ring is made of a material cooperative therewith for durable sliding or wiping sealing contact, for example sheet metal. These materials are, therefore, selected for respective elastic or sealing functions independently of the other function.

An O ring 5, for example made of a rubber-elastic material, holds and seals the outer ring 1 in a structure S about axle or shaft A. Two O rings 10 and 11 on opposite sides of a self-closing expansion joint 6a in inner ring 6 similarly hold and seal the inner ring relative to the shaft A. The inner ring therefore follows the rotary motion of the shaft but is able to shift on the shaft when axial shaft displacements occur. The contact pressures respectively between the members 3 and 4 and the flanges 7 and 8 are, therefore, identical.

Figure 2:
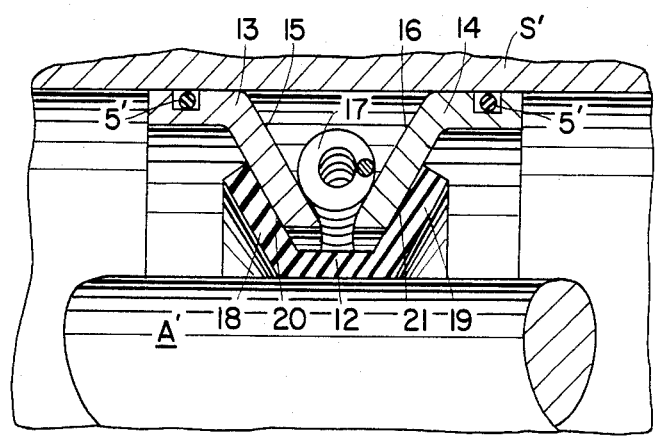
FIG. 2 shows a diametric, cross-sectional elevation of a diametric half of a second preferred embodiment in operative association with an axle or shaft and structure thereabout.

In the embodiment shown in FIG. 2, the outer ring comprises two, identically-configured units 13 and 14. Each has an axially-oblique member 15, 16 projecting radially inwardly in a mirror-image relationship with the other and, thus, convergingly.

A garter spring 17 which is expandable in the radial direction bears on the facing surfaces of the converging members 15, 16 and, therefore, causes them to be resiliently forced against straddling flange members 18 and 19 of an inner ring 12. The necessary axial mobility of the inner and outer rings 12 and 13, 14 occurs from the material of O rings 5' supporting the outer ring in structure S' about axle A' and the material of the inner ring 12. These are made of an elastic material and therefore possess the requisite resilience.

The separate portions 13 and 14 of the outer ring, however, are made of sheet steel and are coated with polytetrafluoroethylene at their contact surfaces 20 and 21. The inner ring 12 is made of rubber.

Figure 3:
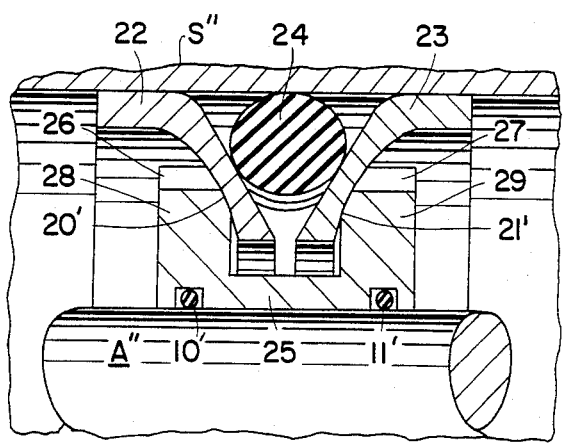
FIG. 3 shows a diametric, cross-sectional elevation of a diametric half of a third preferred embodiment in operative association with an axle or shaft and structure thereabout.

In the embodiment shown in FIG. 3, the outer ring again comprises separate ring members 22 and 23. These are molded from polytetrafluoroethylene and have a radially-inwardly converging, mirror-image relationship with each other. They bear with converging, concave surfaces 20', 21' on facing surfaces of flange members 28, 29 of U-shaped inner ring 25 under the urging of a resiliently compressing O ring 24 made of a rubber-elastic material which also bears on the interior wall of the structure S" about the sealed axle A". In this way, effective static sealing of the two partial outer rings 22 and 23 is assured along with good axial mobility of both rings.

The inner ring 25 is molded from a ceramic material. Its U-section is sealingly supported for rotation with the shaft S" to be sealed by O rings 10' and 11' made of a rubber-elastic material. Thermal expansion therefore cannot be transmitted to the inner ring 25.

The surfaces of the outwardly-projecting flange members 28, 29 of the inner ring are complementarily curved to the concave members 22 and 23 of the outer ring. The profile offsets which occur upon angular displacements of the sealed shaft are thus absorbed more effectively. They will not directly result in damage to the contact surfaces 20 and 21, especially from the edges of the inner ring members.

Thus, the radially-innermost edges of the members of the inner ring may be provided with hydrodynamically-acting back-feed elements in the form of radially-projecting, circumferentially-spaced paddles 26, 27. The paddles 26, 27, which are uniformly distributed over the outer periphery of the members 28, 29 of the inner ring and project outwardly in the radial direction, cause impinging medium to be fed back to each adjacent space when rotary motion of the shaft A" and inner ring is initiated. Through this dynamic effect, they help to improve the desired sealing action.

It will be appreciated that the instant specification and claims are set forth by way of illustration and not of limitation, and that various changes and modifications may be made without departing from the spirit and scope of the present invention.

What is claimed is:

1. A seal for sealing about an axle or shaft rotatable axially relative to a structure thereabout, comprising:

inner and outer sealing rings for respective, fixed connection to the axle or shaft and structure thereabout, each ring having a pair of members associated therewith, at least one sealingly, and extending generally toward the other ring, the members associated with one ring being axially between the members associated with the other ring; and a resilient element between the members associated with the one ring for urging the members associated with the one ring axially of the axle or shaft into sealing engagement with the members associated with the other ring, whereby to maintain uniform sealing engagement force between the members irrespective of relative axial displacement between the axle or shaft and structure thereabout.

2. The seal of claim 1, wherein the facing surfaces of the members associated with the one ring converge towards each other and the resilient element comprises a garter or garter-like ring engaging therebetween.

3. The seal of claim 2, wherein the resilient element comprises a rubber-elastic O ring.

4. The seal of claim 3, wherein the resilient element bears on the structure about the axle or shaft.

5. The seal of claim 1, wherein the surfaces of the members associated with the one ring which are urged axially into sealing engagement with the members associated with the other ring are concave.

6. The seal of claim 2, wherein the surfaces of the members associated with the one ring which are urged axially into sealing engagement with the members associated with the other ring are concave.

7. The seal of claim 3, wherein the surfaces of the members associated with the one ring which are urged axially into sealing engagement with the members associated with the other ring are concave.

8. The seal of claim 1, wherein the surfaces of the members associated with the one ring which are urged axially into sealing engagement with the members associated with the other ring converge.

9. The seal of claim 2, wherein the surfaces of the members associated with the one ring which are urged axially into sealing engagement with the members associated with the other ring converge.

10. The seal of claim 4, wherein the surfaces of the members associated with the one ring which are urged axially into sealing engagement with the members associated with the other ring converge.

11. The seal of claim 5, wherein the surfaces of the members associated with the one ring which are urged axially into sealing engagement with the members associated with the other ring converge.

12. The seal of claim 7, wherein the surfaces of the members associated with the one ring which are urged axially into sealing engagement with the members associated with the other ring converge.

13. The seal of claim 1, wherein the members associated with one of the rings additionally comprise hydrodynamically-acting back-feed members.

14. The seal of claim 2, wherein the members associated with one of the rings additionally comprise hydrodynamically-acting back-feed members.

15. The seal of claim 4, wherein the members associated with one of the rings additionally comprise hydrodynamically-acting back-feed members.

16. The seal of claim 5, wherein the members associated with one of the rings additionally comprise hydrodynamically-acting back-feed members.

17. The seal of claim 7, wherein the members associated with one of the rings additionally comprise hydrodynamically-acting back-feed members.

18. The seal of claim 12, wherein the members associated with one of the rings additionally comprise hydrodynamically-acting back-feed members.

19. The seal of claim 13, wherein the hydrodynamically-acting back-feed members comprise paddles circumferentially spaced about the members associated with the other ring.

20. The seal of claim 18, wherein the hydrodynamically-acting back-feed members comprise paddles circumferentially spaced about the members associated with the other ring.

* * * * *